United States Patent
Kaneko (10) Patent No.: US 9,236,814 B2
(45) Date of Patent: Jan. 12, 2016

(54) PARALLEL INVERTER DEVICE AND METHOD FOR CONTROL THEREOF

(71) Applicant: FUJI ELECTRIC CO., LTD., Kawasaki-shi (JP)

(72) Inventor: Takayuki Kaneko, Kodaira (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 445 days.

(21) Appl. No.: 13/677,287

(22) Filed: Nov. 14, 2012

(65) Prior Publication Data
US 2013/0141952 A1    Jun. 6, 2013

(30) Foreign Application Priority Data

Dec. 2, 2011    (JP) .................................. 2011-264191

(51) Int. Cl.
*H02J 1/10*    (2006.01)
*H02M 7/537*    (2006.01)
*H02M 7/493*    (2007.01)

(52) U.S. Cl.
CPC .............. *H02M 7/537* (2013.01); *H02M 7/493* (2013.01)

(58) Field of Classification Search
CPC .............................. H02M 7/537; H02M 7/493
USPC ........................................ 363/71, 72; 307/82
See application file for complete search history.

(56) References Cited

U.S. PATENT DOCUMENTS 3,823,362 A * 7/1974 Bailey .................... H02M 7/162
219/779
5,757,634 A * 5/1998 Ferens .................... H02M 7/493
363/41

FOREIGN PATENT DOCUMENTS

| JP | 03-159596 A | 7/1991 |
| JP | H11-206167 A | 7/1999 |
| JP | 2008-228548 A | 9/2008 |
| JP | 2011-010117 A | 1/2011 |

OTHER PUBLICATIONS

Office Action issued by Japan Patent Office on Oct. 2, 2015 with English Translation.

* cited by examiner

*Primary Examiner* — Adolf Berhane
*Assistant Examiner* — Afework Demisse
(74) *Attorney, Agent, or Firm* — Rabin & Berdo, P.C.

(57) ABSTRACT

Inverters connected in parallel each include a power converter that carries out a direct current to alternating current conversion and supplies voltage to a motor, and a control unit, where one of the inverters is a master inverter and the control unit computes a voltage command value for the power converter in the one inverter, while the other inverter is a slave inverter and the power converter in the slave inverter is driven by the voltage command value, a transmission means transmits the voltage command value, and the control unit of the master inverter includes a delay device that delays the voltage command value by a transmission time needed when transmitting a computed voltage command value to the slave inverter, and provides the voltage command value delayed by the delay device to the power converter of the master inverter.

14 Claims, 5 Drawing Sheets

PARALLEL INVERTER DEVICE AND METHOD FOR CONTROL THEREOF

CROSS-REFERENCE TO RELATED APPLICATIONS

The present application claims priority from Japanese patent application serial number 2011-264191, filed on Dec. 2, 2011 and incorporated herein by reference.

BACKGROUND OF THE INVENTION

1. Technical Field

The present invention relates to a parallel inverter device that drives a load such as an alternating current motor using a plurality of inverters connected in parallel.

2. Related Art

In general, an inverter is configured of a power converter and a control device that controls the power converter. When driving an alternating current motor with the inverter, a torque command value or voltage command value sent from the control device is transmitted to a plurality of power converters, and an operating of each power converter is carried out.

For example, heretofore known technology whereby each of a plurality of inverters includes an output current control system, and each inverter individually drives an alternating current motor, is described in JP-A-3-159596 (Page 3, top left column, Line 8 to bottom left column, Line 13, FIG. 2, and the like).

Figure 4:
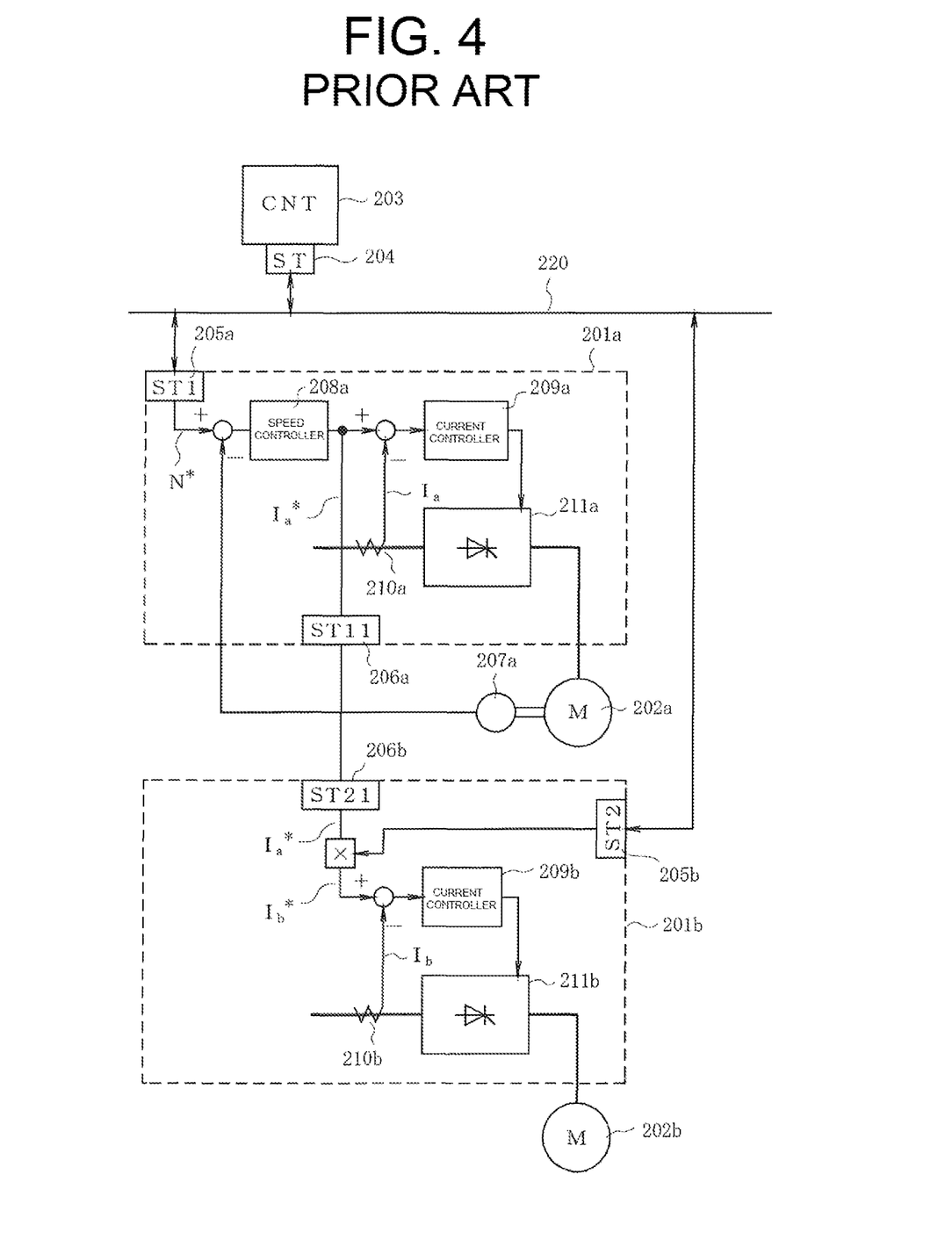
FIG. 4 is a configuration diagram of heretofore known technology described in JP-A-3-159596 (Page 3, top left column, Line 8 to bottom left column, Line 13, FIG. 2, and the like)

FIG. 4 is a configuration diagram of the heretofore known technology described in JP-A-3-159596 (Page 3, top left column, Line 8 to bottom left column, Line 13, FIG. 2, and the like), wherein reference numerals 201a and 201b are inverters, 202a and 202b are alternating current motors individually driven by the inverters 201a and 201b respectively, 203 is a controller, 204 is a master station, 205a, 205b, 206a, and 206b are remote stations, 207a is a speed sensor, 208a is a speed controller, 209a and 209b are current controllers, 210a and 210b are current sensors, 211a and 211b are power converters (inverter portions) that carry out a direct current to alternating current conversion by an action of a semiconductor switching element, and 220 is a transmission line.

This heretofore known technology is such that information can be serially transmitted between the controller 203 and the inverters 201a and 201b. Further, the controller 203 is configured so that the motors 202a and 202b are individually driven by calculated torque command values being distributed, the distributed torque command values being transmitted individually to the inverters 201a and 201b by serial transmission, and each of the inverters 201a and 201b acting in accordance with its own torque command value.

In FIG. 4, N* is a speed command value, $I_a^*$ and $I_b^*$ are current command values of the inverters 201a and 201b, and $I_a$ and $I_b$ are current detection values of the inverters 201a and 201b.

Meanwhile, a parallel inverter device wherein increased capacity is enabled by connecting the output sides of a plurality of inverters in parallel, in order to drive a high-capacity alternating current motor, is described in, for example, JP-A-2008-228548 (Paragraphs [0031] to [0040], FIG. 4, FIG. 5, and the like).

Figure 5:
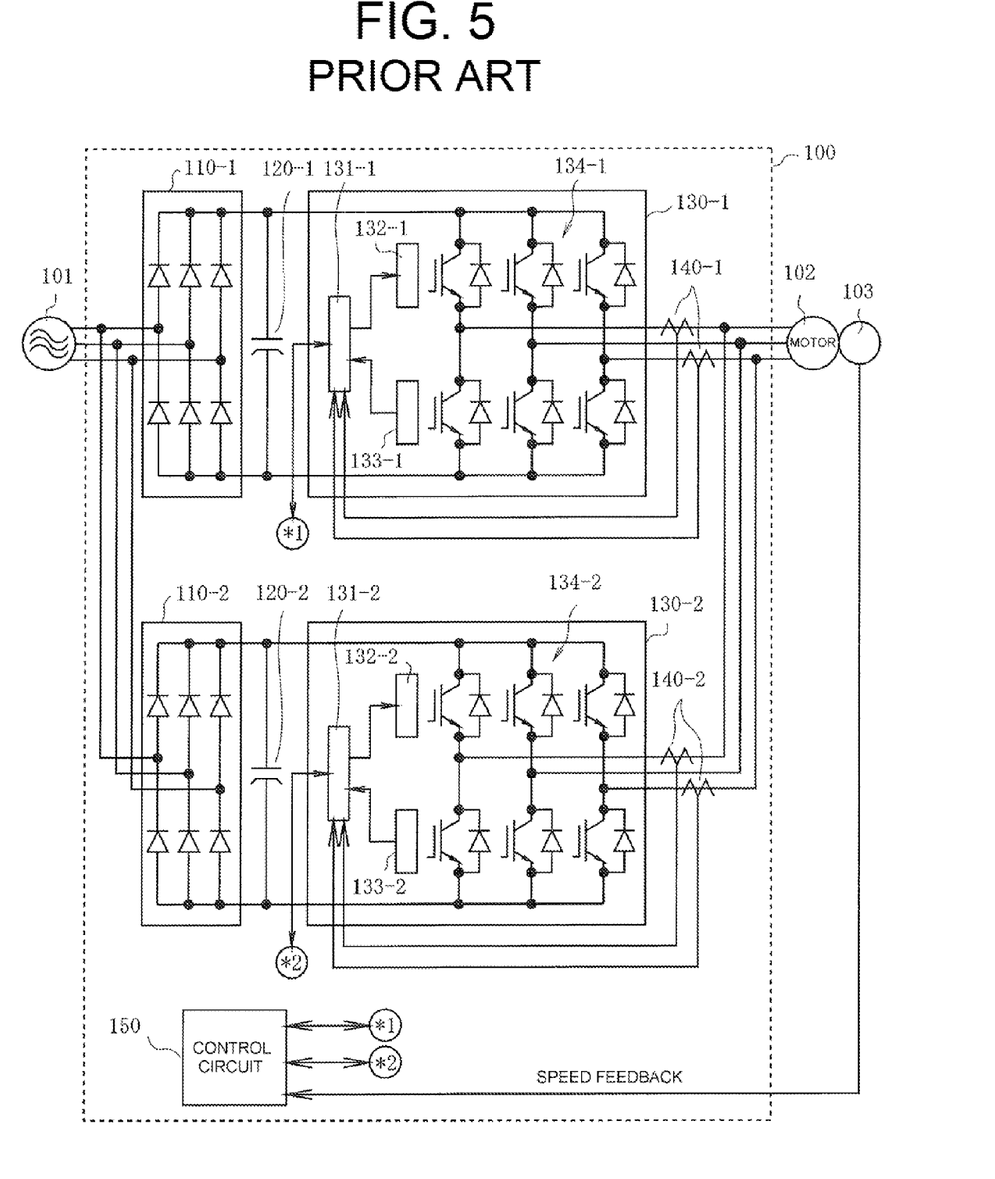
FIG. 5 is a configuration diagram of heretofore known technology described in JP-A-2008-228548 (Paragraphs [0031] to [0040], FIG. 4, FIG. 5, and the like).

FIG. 5 is a configuration diagram of the heretofore known technology described in JP-A-2008-228548 (Paragraphs [0031] to [0040], FIG. 4, FIG. 5, and the like), wherein reference numeral 100 is a parallel inverter device, 101 is an alternating current power source, 102 is an alternating current motor, 103 is a speed sensor, 110-1 and 110-2 are converters, 120-1 and 120-2 are smoothing capacitors, 130-1 and 130-2 are inverters, 131-1 and 131-2 are communication circuits, 132-1 and 132-2 are PWM generating circuits, 133-1 and 133-2 are condition monitoring circuits, 134-1 and 134-2 are power converters (PWM inverter portions), 140-1 and 140-2 are current sensors, and 150 is a control circuit.

This heretofore known technology is such that the two inverters 130-1 and 130-2 are connected in parallel between the alternating current power source 101 and the motor 102, a synchronization signal and a voltage command value are transmitted using a serial transmission means from the control circuit 150 to the communication circuits 131-1 and 131-2 in the inverters 130-1 and 130-2 and, by the inverters 130-1 and 130-2 acting based on the synchronization signal and the voltage command value, the outputs of the two inverters 130-1 and 130-2 are totaled, and supplied to the single motor 102.

The heretofore known technology according to JP-A-3-159596 (Page 3, top left column, Line 8 to bottom left column, Line 13, FIG. 2, and the like) is such that the inverters 201a and 201b respectively include the current controllers 209a and 209b, which control the output current, and as a result of the current controllers 209a and 209b responding individually, there is a danger of variation occurring in the voltage command values acting as the outputs of the current controllers 209a and 209b. Because of this, it may happen that an error occurs between the output voltages of the inverters 201a and 201b, and a cross-current or circulating current (hereafter, these will be referred to collectively as a cross-current) flows between the inverters.

As a countermeasure, it is necessary to secure a surplus equivalent to the amount of cross-current as a current capacity margin of the power converters 211a and 211b, and a problem occurs in that when the current value thereof is large, the capacity of the power converters increases, and the cost increases.

Also, it is necessary to install an AC reactor or interphase reactor in order to suppress instantaneous cross-current, which leads to an overall increase in the size and weight of the device, and to an increase in cost.

As the heretofore known technology described in JP-A-2008-228548 (Paragraphs [0031] to [0040], FIG. 4, FIG. 5, and the like) is such that a voltage command value is sent using the serial transmission means from the control circuit 150 to the communication circuits 131-1 and 131-2 of the inverters 130-1 and 130-2 respectively, and the inverters 130-1 and 130-2 drive the power converters 134-1 and 134-2 in accordance with the received voltage command value, it is necessary to configure the connection form (topology) of the inverters 130-1 and 130-2 so that the delays in transmission time from the control circuit 150 to the communication circuits 131-1 and 131-2 are identical.

Types of connection include, for example, a ring type connection wherein a plurality of inverters have no master-slave relationship, and a master-slave type connection wherein the control unit of one inverter is a master inverter that computes a voltage command value by itself and directly drives its own power converter, and the remaining inverters are slave inverters, each of which drives its own power converter based on the voltage command value received via the transmission means.

However, even in the event that these types of connection are adopted, it may happen, due to a delay in transmitting a control signal, that not all the inverter voltage command values coincide temporally, and it may happen that errors occur between the inverter output voltages. In this case, there is a problem in that excess cross-current flows between power converters through the wiring inductance of the output cables of power converters connected in parallel, and the semiconductor switching element is damaged, or the like.

SUMMARY OF THE INVENTION

Therefore, one object of the invention is to provide a parallel inverter device such that delay in the transmission of a voltage command value among a plurality of inverters is eliminated, thereby forestalling the occurrence of cross-current and damage to a semiconductor switching element.

In order to achieve the above object, a first aspect of the invention is a parallel inverter device, including a plurality of inverters connected in parallel that supply alternating current voltage to a single load, wherein each inverter includes a power converter that carries out a direct current to alternating current conversion by an action of a semiconductor switching element, and supplies alternating current voltage to the load, and a power converter control unit, and one inverter of the plurality of inverters is a master inverter wherein the control unit computes a voltage command value for the power converter in the one inverter, while the other inverter is a slave inverter with a power converter driven in accordance with the voltage command value, and wherein there is provided a transmission means whereby a voltage command value computed by the control unit of the master inverter is transmitted to the slave inverter, and the control unit of the master inverter includes a delay device that delays the voltage command value by a transmission time needed when transmitting a computed voltage command value to the slave inverter, and provides the voltage command value delayed by the delay device to the power converter of the master inverter.

A second aspect of the invention is a parallel inverter device, including three or more inverters connected in parallel that supply alternating current voltage to a single load, wherein each inverter includes a power converter that carries out a direct current to alternating current conversion by an action of a semiconductor switching element, and supplies alternating current voltage to the load, and a power converter control unit, and one inverter of the three or more inverters is a master inverter wherein the control unit computes a voltage command value for the power converter in the one inverter, while the other inverters are slave inverters and the power converters in the slave inverters are driven in accordance with the voltage command value, and wherein there is provided a transmission means whereby a voltage command value computed by the control unit of the master inverter is transmitted to the slave inverters, the control unit in the master inverter includes a delay device that delays the voltage command value by a transmission time needed when transmitting a computed voltage command value to the slave inverter needing the longest transmission time, and provides the voltage command value delayed by the delay device to the power converter of the master inverter, and the control unit in each slave inverter includes a delay device that delays a voltage command value transmitted from the master inverter or another slave inverter so as to provide a voltage command value synchronous with the voltage command value delayed by the delay device of the master inverter to the power converter of the slave inverter.

A third aspect of the invention is the parallel inverter device according to the first or second aspect, wherein the slave inverter includes a synchronization device that synchronizes switching timing of the power converter of the slave inverter with switching timing of the power converter of the master inverter.

A fourth aspect of the invention is the parallel inverter device according to the first aspect, wherein the master inverter transmits a voltage command value in synchronization with the switching timing of the power converter of the master inverter in a fixed cycle, and controls so that the time from the start of transmission to the finish of transmission of a voltage command value by the master inverter and the time from the start of reception to the completion of reception of a voltage command value by the slave inverter are identical.

A fifth aspect of the invention is the parallel inverter device according to the first aspect, wherein the delay device adjusts the delay time so that the size of a voltage command value for the master inverter and the size of a voltage command value for the slave inverter are identical.

According to the invention, by synchronizing the voltage command values provided to the power converters in each of the plurality of inverters connected in parallel so that the sizes of the voltage command values are identical, it is possible to drastically reduce errors between inverter output voltages, and thus possible to prevent an occurrence of cross-current and damage to a semiconductor switching element. Also, as it is possible to reduce the capacity of, or omit, an AC reactor or the like for suppressing cross-current, without needing to increase the capacity of the power converters more than necessary, it is possible to reduce the overall size and weight of the device, and to reduce cost.

DETAILED DESCRIPTION OF THE EMBODIMENTS

Hereafter, a description will be given, based on the drawings, of an embodiment of the invention.

Figure 1:
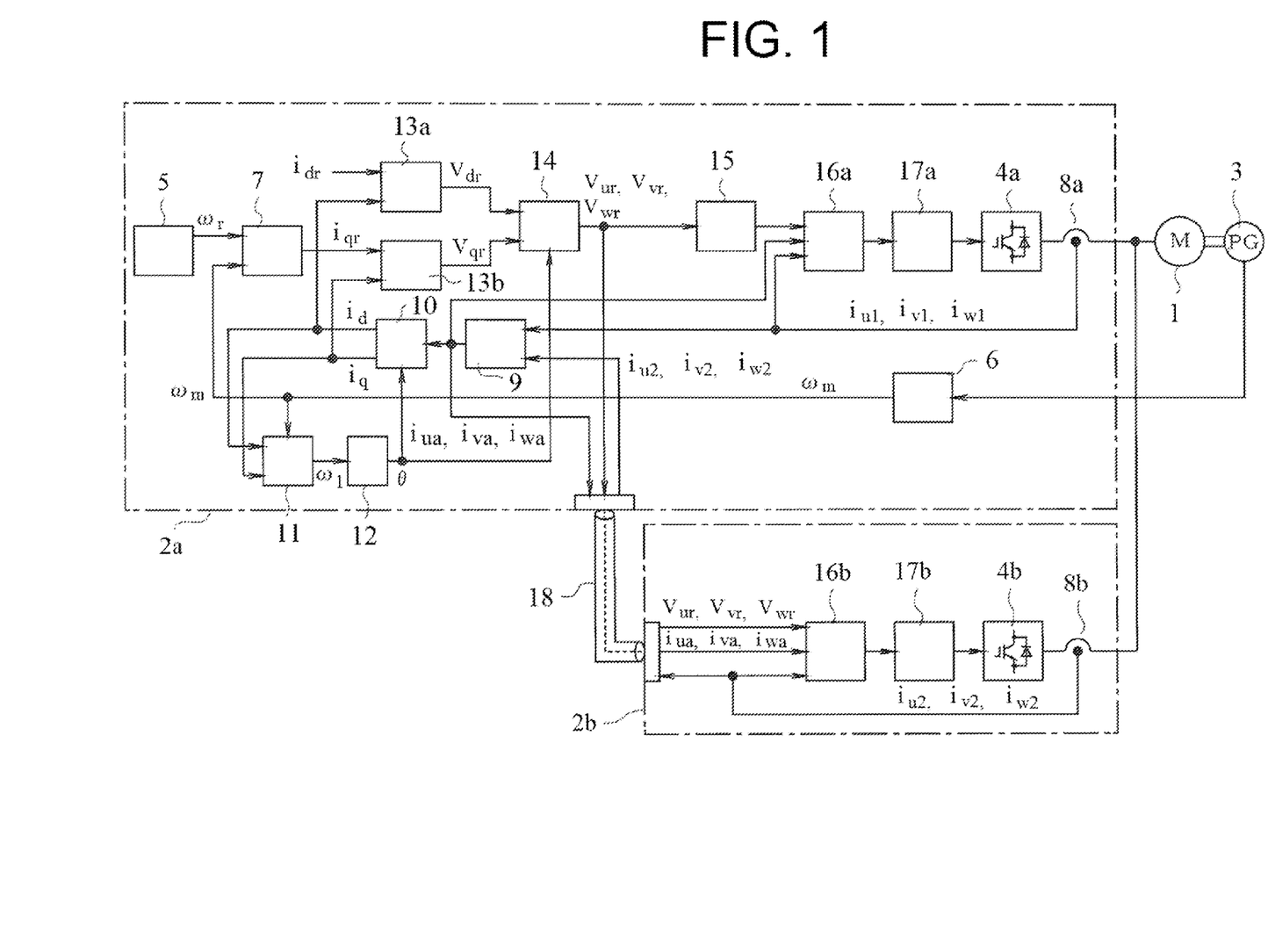
FIG. 1 is a block diagram showing an embodiment of the invention.

FIG. 1 is a block diagram showing a configuration of this embodiment, wherein the parallel inverter device is a device for driving one alternating current motor 1, such as an induction motor, by the totaled output of two inverters 2a and 2b connected in parallel. Although the inverters 2a and 2b and the alternating current motor 1 are of a three-phase configuration, they are represented by a single-line diagram in FIG. 1.

In FIG. 1, a rotation position detection unit 3, such as a pulse encoder, for obtaining rotation angle information is connected to the motor 1. Also, of the inverters 2a and 2b that drive the motor 1, one inverter 2a functions as a master inverter, and the other inverter 2b as a slave inverter, wherein voltage command values $v_{ur}$, $v_{vr}$, and $v_{wr}$ generated by the master inverter 2a, as well as being used in controlling a power converter 4a of the inverter 2a, are also transmitted to the slave inverter 2b, and used in controlling a power converter 4b inside the inverter 2b, as will be described hereafter.

The number of inverters in parallel is decided in accordance with the rated current of the motor 1 and inverters.

The inverters 2a and 2b include, respectively, the power converters 4a and 4b, which turn a semiconductor switching element such as an IGBT on and off, thereby carrying out a direct current to alternating current conversion. Although a detailed description of the configuration of the power converters 4a and 4b will be omitted, the power converters 4a and 4b include a main circuit formed of the switching element, and a gate drive circuit and control unit that drive the main circuit, wherein the control unit is realized by an arithmetic processing unit (including a program), such as a microcomputer, or an electronic circuit.

The inverter 2a operating as the master inverter includes a speed command generating unit 5 that generates a speed command value $\omega_r$ for a motor 1 acceleration and deceleration pattern, or the like, a rotation speed detection unit 6 that obtains a motor speed $\omega_m$ from rotation angle information obtained from the rotation position detection unit 3, a speed control unit 7 that generates a q-axis current command value $i_{qr}$ for the motor 1 from the speed command value $\omega_r$ and motor speed $\omega_m$, a current detector 8a that detects inverter 2a output currents $i_{u1}$, $i_{v1}$, and $i_{w1}$, a total current detection unit 9 that obtains total currents $i_{ua}$, $i_{va}$, and $i_{wa}$ to be supplied to the motor 1 from the sum of the output currents $i_{u1}$, $i_{v1}$, and $i_{w1}$ and slave inverter 2b output currents $i_{u2}$, $i_{v2}$, and $i_{w2}$, a coordinate conversion unit 10 that obtains a d-axis current $i_d$ and a q-axis current $i_q$ from the total currents $i_{ua}$, $i_{va}$, and $i_{wa}$ and an electrical angle $\theta$, a primary frequency computing unit 11 that computes a primary frequency $\omega_1$ based on a slip frequency $\omega_s$ obtained from the d-axis current $i_d$, q-axis current $i_q$, and motor speed $\omega_m$, an electrical angle computing unit 12 that obtains the electrical angle $\theta$ from the primary frequency $\omega_1$, a d-axis current control unit 13a that obtains a d-axis voltage command value $v_{dr}$ of each of the inverters 2a and 2b from a d-axis current command value $i_{dr}$ and the d-axis current $i_d$, a q-axis current control unit 13b that obtains a q-axis voltage command value $v_{qr}$ of each of the inverters 2a and 2b from the q-axis current command value $i_{qr}$ and q-axis current $i_q$, a coordinate conversion unit 14 that obtains voltage command values $v_{ur}$, $v_{vr}$, and $v_{wr}$ for each phase from the d-axis voltage command value $v_{dr}$, q-axis voltage command value $v_{qr}$, and electrical angle $\theta$, a delay device 15 that delays the voltage command values $v_{ur}$, $v_{vr}$, and $v_{wr}$ for a predetermined time, a cross-current control unit 16a that corrects the voltage command values delayed by the delay device 15 based on the total currents $i_{ua}$, $i_{va}$, and $i_{wa}$ and the inverter 2a output currents $i_{u1}$, $i_{v1}$, and $i_{w1}$ so that the output currents of the inverters 2a and 2b are balanced, and agate drive signal generating unit 17a that generates a gate drive signal of the switching element inside the power converter 4a from a voltage command value output from the cross-current control unit 16a.

Herein, the speed control unit 7, d-axis current control unit 13a, and q-axis current control unit 13b are configured of, for example, a proportional-integral (PI) regulator.

Also, the coordinate conversion unit 10 converts a three-phase current component into d and q-axis current components in rotating coordinates, and the coordinate conversion unit 14 converts d and q-axis voltage components into a three-phase voltage element, but as the configurations and actions thereof are commonly known, details will be omitted.

Meanwhile, the inverter 2b operating as the slave inverter includes, apart from the power converter 4b and a gate drive signal generating unit 17b, a current detector 8b that detects output currents $i_{u2}$, $i_{v2}$, and $i_{w2}$, and a cross-current control unit 16b that corrects the voltage command values $v_{ur}$, $v_{vr}$, and $v_{wr}$ based on the total currents $i_{ua}$, $i_{va}$, and $i_{wa}$ and the inverter 2b output currents $i_{u2}$, $i_{v2}$, and $i_{w2}$ so that the output currents of the inverters 2a and 2b are balanced.

Herein, one portion of the functions of the slave inverter 2b may be realized using functions of the master inverter 2a.

Reference sign 18 is a transmission means whereby the voltage command values $v_{ur}$, $v_{vr}$, and $v_{wr}$, total currents $i_{ua}$, $i_{va}$, and $i_{wa}$, and slave inverter 2b output currents $i_{u2}$, $i_{v2}$, and $i_{w2}$ are serially transmitted between the inverters 2a and 2b, and includes hardware such as a cable, and predetermined communication protocol, or the like.

Next, a description will be given of an action of the embodiment.

In the master inverter 2a, the speed command generating unit 5 generates the speed command value $\omega_r$ for a period from the motor 1 accelerating from a stopped state, and reaching an objective speed, until decelerating to a stop in accordance with predetermined conditions. The speed control unit 7 computes the deviation between the speed command value $\omega_r$ and the motor speed $\omega_m$ by a proportional-integral calculation, and outputs a q-axis current command value $i_{qr}$ equivalent to the torque generated by the motor 1.

The current control units 13a and 13b output the d-axis voltage command value $v_{dr}$ and q-axis voltage command value $v_{qr}$ respectively, by a proportional-integral calculation, so that the d-axis current $i_d$ and q-axis current $i_q$ output from the coordinate conversion unit 10 conform to the d-axis current command value $i_{dr}$ and q-axis current command value $i_{qr}$. The coordinate conversion unit 14 converts the voltage command values $v_{dr}$ and $v_{qr}$ to the three-phase voltage command values $v_{ur}$, $v_{vr}$, and $v_{wr}$, based on the electrical angle $\theta$.

The voltage command values $v_{ur}$, $v_{vr}$, and $v_{wr}$ are transmitted not only to the power converter 4a in the master inverter 2a, but also, via the transmission means 18, to the power converter 4b in the slave inverter 2b.

Generally, when employing serial transmission as the transmission means 18, a certain time is needed for the voltage command values $v_{ur}$, $v_{vr}$, and $v_{wr}$ to be forwarded from the master inverter 2a to a memory inside the microcomputer of the slave inverter 2b. While the switching frequency of a power converter is normally a few kilohertz, a microcomputer executes various kinds of control computation in an update cycle of a few tens of microseconds to a few hundred microseconds.

Consequently, when an information transmission time using the transmission means 18 exceeds the control computation cycle of the microcomputer, the voltage command values $v_{ur}$, $v_{vr}$, and $v_{wr}$ received by the slave inverter 2b are such that a time delay occurs with respect to the master inverter 2a. As the voltage command values are output as PWM controlled voltages via the gate drive signal generating unit 17b and power converter 4b, the effect of the delay in transmitting the voltage command values $v_{ur}$, $v_{vr}$, and $v_{wr}$ appears in the output voltage of the power converter 4b, with an error occurring between the output voltage of the master inverter 2a and the output voltage of the slave inverter 2b. Because of this, cross-current flows between the two inverters 2a and 2b, with the maximum value of the cross-current being determined in accordance with an inductance component included in the cable between the inverters 2a and 2b.

Therefore, in the embodiment, the delay device 15 is provided on the output side of the coordinate conversion unit 14 of the master inverter 2a, and the delay time of the delay device 15 is set to be equivalent to the transmission time when the voltage command values $v_{ur}$, $v_{vr}$, and $v_{wr}$ are transmitted to the slave inverter 2b (the time until the voltage command values $v_{ur}$, $v_{vr}$, and $v_{wr}$ sent from the master inverter 2a reach the cross-current control unit 16b of the slave inverter 2b).

Because of this, a time control ceases to occur between the voltage command values $v_{ur}$, $v_{vr}$, and $v_{wr}$ input into the cross-current control unit 16a of the master inverter 2a and the voltage command values $v_{ur}$, $v_{vr}$, and $v_{wr}$ input into the cross-current control unit 16b of the slave inverter 2b, and it is thus possible to drastically reduce the error between the output voltages of the master inverter 2a and slave inverter 2b.

Next, a description will be given, while referring to FIGS. 2A and 2B, of switching timings of the power converters 4a and 4b of the inverters 2a and 2b respectively.

The transmission means 18 is such that the voltage command values $v_{ur}$, $v_{vr}$, and $v_{wr}$ are transmitted and received in a fixed cycle $T_8$ by an interrupt control using the microcomputers, or the like, in the inverters 2a and 2b. The cycle $T_8$ is an integral multiple (eight times in the example shown) of a switching cycle $T_0$ of the power converters 4a and 4b, and is set so that the timing of the start of transmission of the voltage command values $v_{ur}$, $v_{vr}$, and $v_{wr}$ from the master inverter 2a and the switching timing are synchronous. Herein, the switching cycles $T_0$ of the power converters 4a and 4b are the same.

Figure 2A:
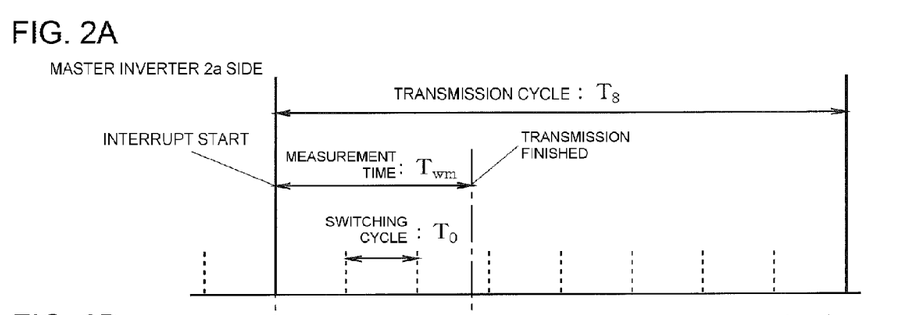
FIGS. 2A and 2B are illustrations of an action of the embodiment of the invention.
Figure 2B:
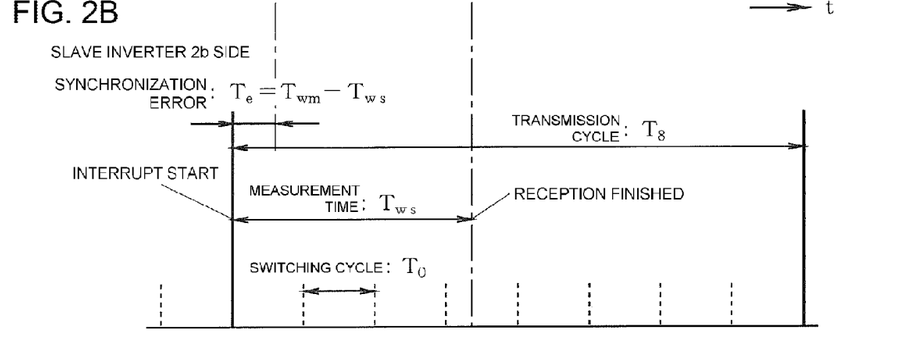

In FIGS. 2A and 2B, in the microcomputer on the master inverter 2a side, a time $T_{wm}$ from the start to the finish of transmission of the voltage command values $v_{ur}$, $v_{ur}$, and $v_{wr}$ is recorded, and sent to the slave inverter 2b at the next timing after the elapse of the transmission cycle $T_8$, by a transmission interrupt process. In the microcomputer on the slave inverter 2b side, a time $T_{ws}$ from the interrupt start timing to the finish of reception is measured, a deviation from the time $T_{wm}$ ($T_{wm}-T_{ws}$) is obtained, and the deviation is stored in the memory as a synchronization error $T_e(=T_{wm}-T_{ws})$.

Then, by adjusting the switching timing so that the interrupt start timing of the slave inverter 2b coincides with the timing at which the voltage command values $v_{ur}$, $v_{vr}$, and $v_{wr}$ are transmitted from the master inverter 2a, thereby adjusting the synchronization error $T_e$ to zero, it is possible to synchronize the switching timings of the two inverters 2a and 2b without transmitting a special synchronization signal from the master inverter 2a.

Figure 3:
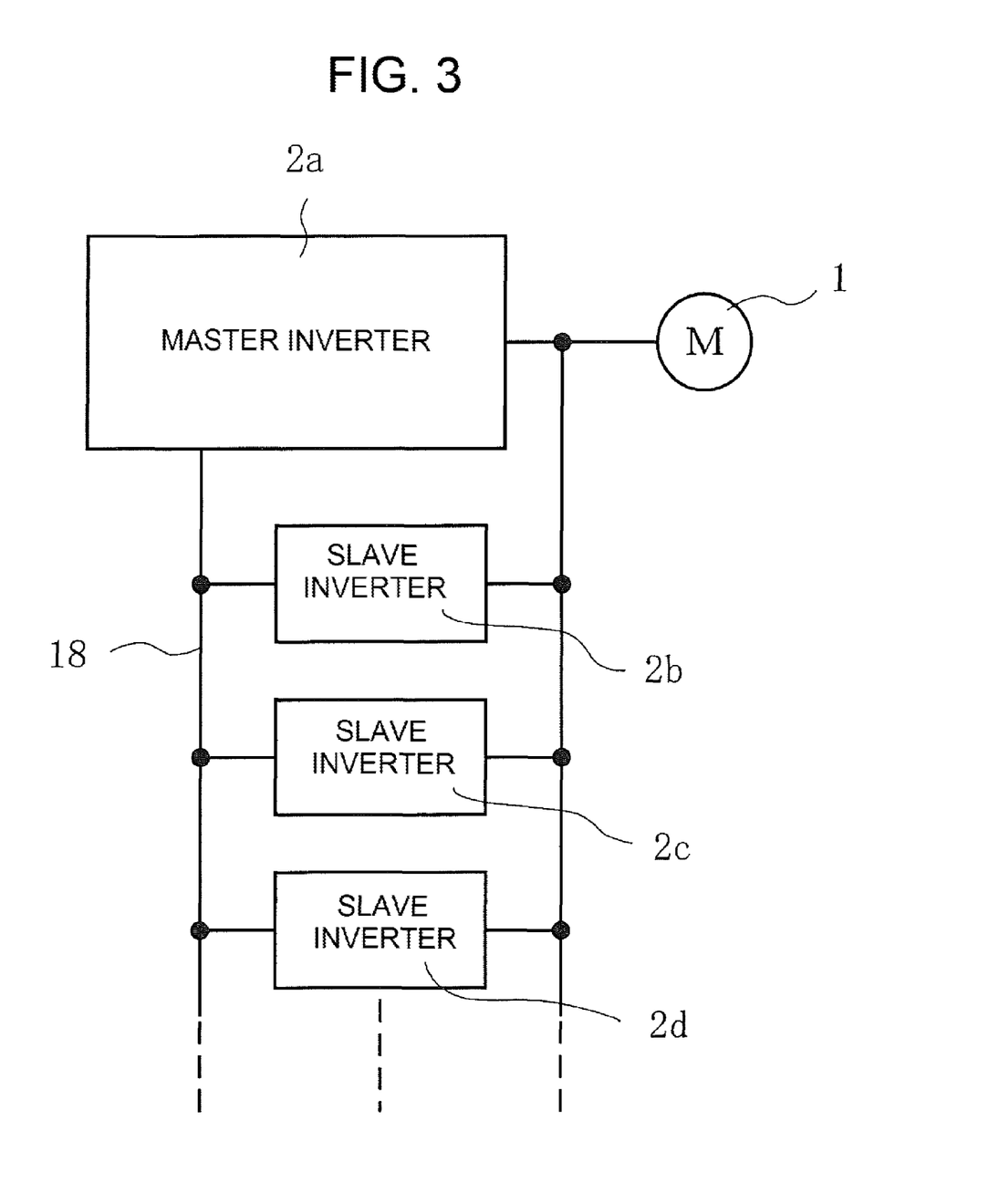
FIG. 3 is a schematic configuration diagram of another embodiment of the invention.

In the embodiment, a description has been given of a case wherein two inverters are connected in parallel, one is a master inverter, and the other is a slave inverter, but the invention can also be applied to a case of a parallel inverter device wherein two or more slave inverters 2b, 2c, 2d, and so on are connected in parallel to one master inverter 2a, as shown in FIG. 3, and the transmission times from the master inverter 2a to each slave inverter 2b, 2c, 2d, and so on differ.

In this kind of case, by providing a delay device in each of the master inverter 2a and, with the exception of the slave inverter with the longest transmission time (for example, 2d), the slave inverters (for example, 2b and 2c), and adjusting the delay time of each delay device in accordance with the transmission time from the master inverter 2a, it is possible to synchronize the voltage command values of all the inverters, thereby reducing the output voltage error to a minimum.

Also, with regard to voltage error due to variation in the switching elements in the power converters in each inverter, total current is calculated by sending the output currents of all the slave inverters to the master inverter 2a via the transmission means 18, and adding the output currents to the output current of the master inverter 2a with the total current detection unit 9. Then, by controlling the voltage command value of each inverter in such a way that the output current of each inverter conforms to a value wherein the total current is divided by the number of parallel inverters by the cross-current control unit 16a, so that the output currents of the master inverter and slave inverters are balanced, it is possible to further reduce the output current error of each inverter.

Although the heretofore described embodiments are such that the induction motor acting as the alternating current motor 1 is driven using a slip frequency type vector control, a V/f control, for example, may also be employed as an inverter control system.

The invention can also be utilized in a parallel inverter device that drives an alternating current load other than an alternating current motor, using a plurality of inverters.

It will be understood by those skilled in the art that the invention may be practiced otherwise than as described in the disclosed embodiments without departing from the scope of the invention.

What is claimed is:

1. A parallel inverter device, comprising a plurality of inverters connected in parallel that supply an alternating current voltage to a single load and a transmission means, wherein
    each of the plurality of inverters includes
        a power converter that converts direct current to alternating current and supplies the alternating current voltage to the single load, and
        a power converter control unit;
    one of the inverters is a master inverter, the power converter control unit thereof computing a voltage command value for the power converter in the master inverter, and another of the inverters is a slave inverter, the power converter of the slave inverter being driven in accordance with said voltage command value;
    the transmission means transmits the voltage command value computed by the power converter control unit of the master inverter to the slave inverter, delayed by a transmission delay time inherent to the transmission means; and
    the power converter control unit included in the master inverter further includes a discrete delay device that delays the voltage command value by a time duration equal to the transmission delay time, and provides the voltage command value delayed by the delay device to the power converter included in the master inverter.

2. The parallel inverter device according to claim 1, wherein the slave inverter includes a synchronization device that synchronizes switching timing of the power converter of the slave inverter with switching timing of the power converter of the master inverter.

3. The parallel inverter device according to claim 1, wherein the master inverter transmits the voltage command value in synchronization with a switching timing of the power converter of the master inverter in a fixed cycle, and the control unit of the master inverter controls a time from a start of transmission to a finish of transmission of the voltage command value by the master inverter and a time from a start of reception to a completion of reception of the voltage command value by the slave inverter to be equal.

4. The parallel inverter device according to claim 1, wherein the delay device adjusts the time duration so that the voltage command value for the master inverter and the voltage command value for the slave inverter are equal.

5. The parallel inverter device according to claim 1, wherein the power converter further comprises a semiconductor switching element.

6. A parallel inverter device, comprising three or more inverters connected in parallel that supply alternating current voltage to a single load, and transmission means, wherein
    each of the inverters includes
        a power converter that carries out a direct current to alternating current conversion, and supplies alternating current voltage to the load,
        a power converter control unit having a delay device;

one of the inverters is a master inverter, the control unit of the master inverter computing a voltage command value for the power converter of the master inverter, the other inverters are slave inverters, and the power converters included in the slave inverters are driven in accordance with the voltage command value;

each transmission means transmits the voltage command value computed by the control unit of the master inverter to a respective slave inverter, delayed by a transmission delay time inherent to respective transmission means;

the power converter control unit included in the master inverter further includes a first discrete delay device that delays the voltage command value by a time duration equal to a longest transmission delay time of the slave inverters, and provides the voltage command value delayed by the first delay device to the power converter of the master inverter, and each of the slave inverters includes a further discrete delay device that further delays a delayed voltage command value received thereby, so as to provide a voltage command value synchronous with the voltage command value delayed by the first delay device.

7. The parallel inverter device according to claim 6, wherein each said slave inverter includes a synchronization device that synchronizes switching timing of the power converter of said slave inverter with switching timing of the power converter of the master inverter.

8. The parallel inverter device according to claim 6, wherein the master inverter transmits the voltage command value in synchronization with the switching timing of the power converter of the master inverter in a fixed cycle, and controls so that a time from a start of transmission to a finish of transmission of the voltage command value by the master inverter and a time from a start of reception to a completion of reception of the voltage command value by each slave inverter are identical.

9. The parallel inverter device according to claim 6, wherein the delay devices adjust respective time durations so that the voltage command value for the master inverter and the voltage command value for each of the slave inverters are equal to each other.

10. The parallel inverter device according to claim 6, wherein the power converter further comprises a semiconductor switching element.

11. A method of controlling a parallel inverter device that includes a plurality of parallel-connected inverters, including a master converter and at least one slave converter, that supply alternating current voltage to a single load, the method comprising:

converting direct current to alternating current by a switching action of a power converter in each of the inverters, supplying the alternating current voltage to the single load, computing a voltage command value for the power converter the master inverter, driving the power converter in the slave inverter in accordance with the voltage command value, transmitting the voltage command value to the slave inverter, delayed by an inherent transmission delay time, delaying the voltage command value by a time duration equal to the inherent transmission delay time, and providing the delayed voltage command value to the power converter of the master inverter.

12. The method according to claim 11, further comprising synchronizing switching timing of the power converter of the slave inverter with switching timing of the power converter of the master inverter.

13. The method according to claim 11, further comprising transmitting the voltage command value in synchronization with the switching timing of the power converter of the master inverter in a fixed cycle, and controlling a time from a start of transmission to a finish of transmission of the voltage command value from the master inverter and a time from a start of reception to a completion of reception of a voltage command value by the slave inverter to be equal to each other.

14. The method according to claim 11, further comprising adjusting the time duration so that the voltage command value for the master inverter and the voltage command value for the slave inverter are equal to each other.

* * * * *